3,284,364
SOIL ANTI-REDEPOSITION AGENTS
Frederick H. Siegele, Westport, Conn., assignor to American Cyanamid Company, Stamford, Conn., a corporation of Maine
Filed Jan. 25, 1963, Ser. No. 253,931
6 Claims. (Cl. 252—132)

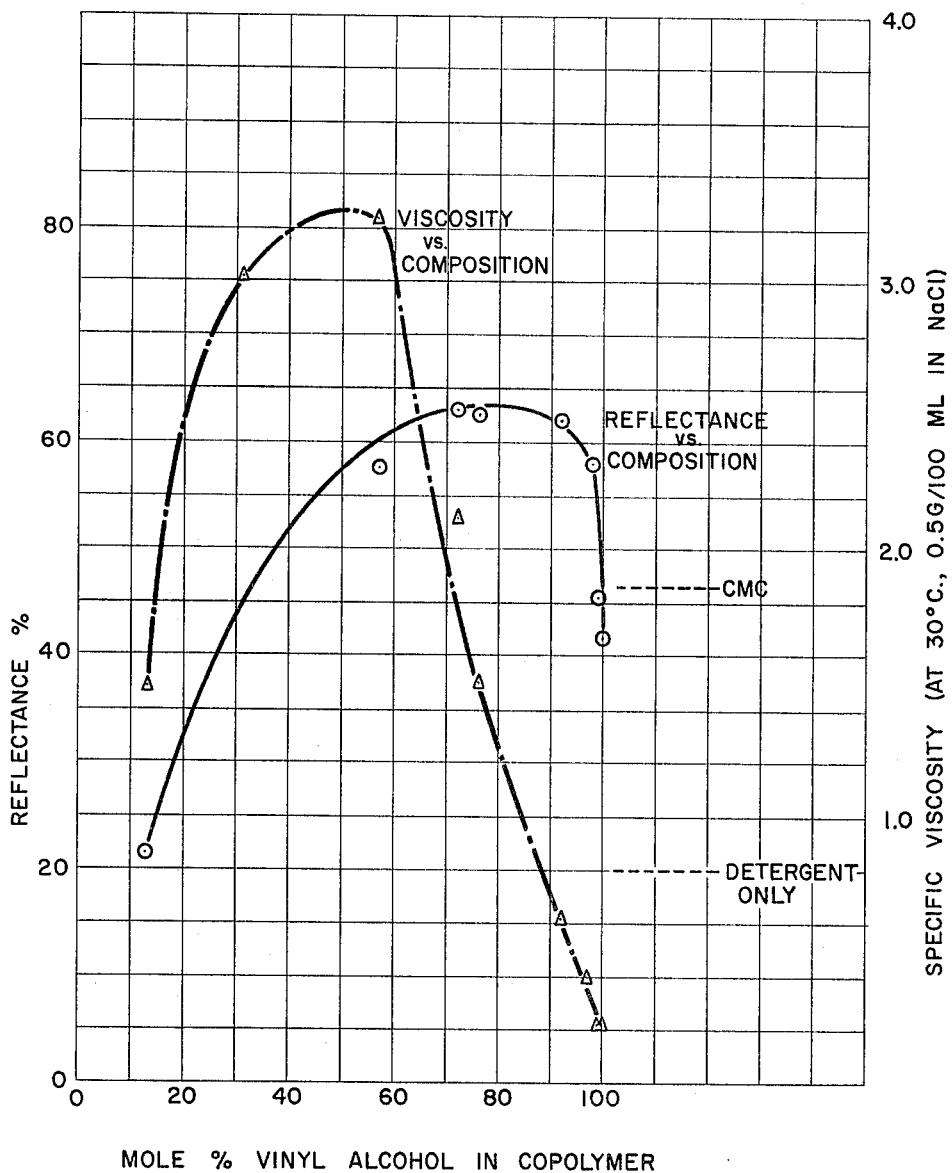

This invention relates to the use of a particular class of polymers as soil redeposition inhibitors to prevent the redeposition of soil onto fabrics, clothes and the like during washing, shampooing, laundering and dry cleaning. More particularly, this invention relates to the use of substantially linear hydrocarbon chain polymers having a hydroxyl to carboxylic acid group molar ratio within critical limits, as soil redeposition inhibitors.

The polymers contemplated for use in accordance with this invention will have a molar ratio in the range of from 30 to 99 of the hydroxyl to about 70 to 1 of the carboxylic acid groups. Preferably the ratio is from about 60 to 90 hydroxyl groups to about 40 to 10 carboxylic acid groups.

These substantially linear hydrocarbon chain polymers of relatively high molecular weight, as determined by their specific viscosity and preferably containing predominantly hydrophilic hydroxyl groups and a lesser number of carboxylic acid groups, which term is intended to include salts thereof, are preferably the alkaline hydrolyzed polymers derived from vinyl acetate and a lower alkyl acrylate such as ethyl acrylate, methyl acrylate, propyl acrylate and equivalents thereof.

Additionally, it is greatly preferred that the substantially linear hydrocarbon chain polymers be substantially homogeneous, i.e., that the composition of the polymer be substantially uniform throughout its production, relative to the ultimate hydroxyl to carboxylic acid group ratio.

Advantageously, the polymers contemplated by this invention may be prepared by conventional methods. A preferred method for preparing the preferred substantially homogeneous linear hydrocarbon chain polymers resides in the substantially instantaneous copolymerization of vinyl acetate and a requisite amount of either a carboxylic acid monomer as, for example, acrylic or methacrylic acid or a carboxylic acid derivative which, on hydrolysis, yields a carboxylic acid salt. Illustrative carboxylic acid derivatives which are contemplated herein are, for example, acrylonitrile, acrylamide, acrylate alkyl esters and methacrylate alkyl esters.

In preparing the polymer, the monomers, illustratively vinyl acetate and ethyl acrylate, are introduced in molar amounts which will correspond to the hydroxyl and carboxylate ratios in the final alkaline hydrolyzed polymer.

Preferably, the hydrolyzed polymers may be characterized as being of relatively high molecular weight. Normally, said polymers will be characterized as having specific viscosities of from about .2 to about 4.0 at 30° C. when measured at a concentration of 0.5 g. per 100 ml. in a one normal sodium chloride solution.

After the formation of the polymer it will preferably be subjected to an alkaline hydrolysis, that is, hydrolyzed in the presence of an alkaline material as for example an alkali metal oxide or hydroxide such as sodium, potassium and ammonium hydroxide. Other hydrolysis procedures may be employed. Alkaline hydrolysis of the polymer is normally indicated as complete when the hydrolyzed solution clears. Advantageously, the hydrolyzed copolymers of this invention are water soluble over the entire range of hydroxyl to carboxylate mole ratio. It has been found, however, that the water solubility can be related to the degree of hydrolysis of the copolymer.

While it is not essential that complete hydrolysis of the polymer be effected in order for the polymer to have soil suspending or redeposition inhibiting properties, it is as a general rule desirable to have fully hydrolyzed the product in order to take maximum advantage of the polymer's properties.

The amount of soil redeposition inhibitor or anti-redeposition agent used in any cleaning formulation will vary within wide limits and will depend to a great extent on the particular soap, detergent, synthetic organic non-soap detergent or dry cleaning detergent with which it is used as well as other constituents in the complete formulation. The amount employed will also depend to some extent on the nature and characteristics of the material being cleaned, or whether the fabric be cotton, rayon, acetate, wool, polyester, acrylic or of other origin or mixtures thereof, the purposes for which the fabric or material is intended, the degree of cleanliness desired and other variables. For most purposes, its has been found that from about 0.1 to about 20% by weight based on the weight of a complete formulation containing the soap detergent, non-soap detergent or dry cleaning detergent is usually satisfactory and that within our commercial limits amounts of from about 1 to 15% by weight of a formulation have been found preferable.

It will be noted that the soil anti-redeposition agents of this invention may be employed alone or in combination with one or more other agents known to be useful for this purpose, such as carboxymethyl cellulose, cyanoethylated starches and the like.

The amount of active detergent substituent of a cleaning formulation will also vary within wide limits and will depend upon such factors as specified above and in particular the purpose for which the formulation is intended. It has been found that from about 5 to about 95% of the total weight may advantageously be the detergent constituent with the preferred narrower commercial limits being from about 20 to about 35% by weight.

The cleaning formulation may also have added to it various other special additives such as hydrotopes or coupling agents, building agents and fillers including soda ash, sodium sesquicarbonate, sodium tetrapyrophosphate, sodium tripolyphosphate, sodium silicate, sodium metasilicate, borax and the like. In addition, non-alkaline inorganic salts such as sodium sulfate, sodium chloride and sodium bicarbonate may be added as well as scouring abrasives such as diatomaceous earth or ground pumice, bentonite and various other clays and clay-like substances. The amount of such special purpose additives or builders will naturally vary within wide limits or may even be omitted entirely. However, it has been found that amounts of from about 1% up to as high as 80% by weight based on the formulation weight may be added depending upon the purpose for which the formulation is intended.

The soil redeposition inhibitors of this invention may be incorporated into bar soaps for cleaning, laundering and scrubbing; scouring powders for more abrasive purposes; powdered or flaked soaps and synthetic organic non-soap detergents for laundry and general cleaning; for dry cleaning detergents and agents; and other synthetic detergents in liquid form.

As specific examples of various detergents the following are illustrative: sodium or potassium soaps of the fatty acids both saturated and unsaturated; synthetic organic non-soap detergents including the anionic detergents such as the sulfates of long chain fatty alcohols as sodium lauryl sulfate and sodium stearyl sulfate; the alkylaryl sodium sulfonates such as the alkyl benzene, toluene and naphthalene sodium sulfonates; the fatty monoglyceride sulfates such as sodium glycerol monolaurate sulfate and the dodecyl phenyl polyglycol ethers. In addition, the non-ionics such as pentaerythritol long chain monoesters, the alkyl phenolethylene oxide adducts, and the cationics such as lauramidopropyl dimethylbenzyl ammonium chloride, N-diethylamino oleamide hydrochloride and various dry cleaning detergents or agents such as naphtha, trichloroethylene, perchloroethylene, carbon tetrachloride, Stoddard solvent and the like.

As noted hereinabove, the soil redeposition inhibiting agents of this invention may be employed with conventional hydrotopes or coupling agents such as xylene or toluene sulfonate, particularly in liquid detergent formulations. Quite surprisingly, it has been observed that the soil redeposition inhibitors of this invention function as hydrotopes and function particularly well in this capacity with non-ionic detergents. Thus additional amounts of the soil anti-redeposition agents of this invention may be employed in formulations for the purpose of functioning as hydrotopes, and in this regard may be employed to replace all or part of the hydrotope normally employed.

Some typical illustrative formulations contemplated by this invention are as follows:

LIQUID TYPE

| | |
|---|---|
| Sodium alkylaryl sulfonate | 15.5 |
| Sodium methyl coco taurate | 10.4 |
| Tetrapotassium pyrophosphate | 21.4 |
| Sodium sulfate | 2.1 |
| Sodium silicate, 1:3.25 | 2.5 |
| Soil anti-redeposition agent of this invention (copolymer of 69 parts by weight of vinyl acetate, 31 parts by weight of ethyl acrylate—hydrolyzed) | 1.7 |
| Water | 46.4 |

Trace quantities blue and fluorescent dye.

POWDER TYPE

| | |
|---|---|
| Sodium alkylaryl sulfonate | 36.2 |
| Sodium tripolyphosphate | 35.0 |
| Sodium carbonate | 0.9 |
| Sodium sulfate | 12.5 |
| Sodium silicate | 6.5 |
| Sodium chloride | 1.0 |
| Soil anti-redeposition agent of this invention (copolymer of 69 parts by weight of vinyl acetate, 31 parts by weight of ethyl acrylate—hydrolyzed) | 0.9 |
| Moisture | 7.0 |

Trace quantities of fluorescent dye.

In order to further illustrate the present invention, the following examples are given primarily by way of illustration. No specific details or enumerations contained therein should be construed as limitations on the present invention except insofar as they appear in the appended claims. All parts and percentages are by weight unless otherwise specifically designated.

*Example 1*

1270 parts (14.8 moles) of vinyl acetate and 200 parts (2.0 mole) of ethyl acrylate are placed in a high speed mixer and added thereto are 4 parts of sodium dioctyl sulfosuccinate and 3.3 parts of sodium dihexyl sulfosuccinate. The composition is agitated until the sulfosuccinate surface active agents are dissolved and 2 parts of sodium sulfite dissolved in 2500 parts of water are added to the monomer solution in the high speed mixer.

This composition is thoroughly mixed and the resultant monomeric emulsion is then introduced into a suitable container through which nitrogen is bubbled. Into 700 ml. of water in the reaction vessel 8 parts of a commercially available polyvinyl alcohol and .8 part of sodium dihexyl sulfosuccinate are added with stirring and the temperature of the reaction vessel is heated to 73° C.

2.5 parts of ammonium persulfate is dissolved in 300 parts of water and 15 parts of the persulfate solution is added initially to the surfactant solution in the reaction vessel followed then by simultaneous addition of 270 parts of the persulfate solution and the monomeric emulsion at a rate consistent with maintenance of the reaction vessel temperature at about 73° C. Finally the remaining 15 parts of persulfate solution is added to insure essentially complete conversion. The polymer reaction mixture is then heated for an additional 1 hour at 75° C. Complete conversion of vinyl acetate is required to prevent yellowing of the product upon hydrolysis.

The finished polymer emulsion is then slowly added with stirring to 604 parts (15.1 moles) of sodium hydroxide dissolved in 3200 parts of water. When all of the emulsion has been added the temperature of the mixture is raised to 80 to 90° C. and held there for four hours. After cooling the hydrolyzed polymer may be separated from the solution by precipitation by the addition of alcohol such as methanol or by drying and washing.

The resulting product was characterized by a specific viscosity at 30° C. at 0.5 g./100 ml. in a one molar aqueous sodium chloride solution of 0.58 and by a hydroxyl to sodium carboxylate molar ratio of 88:12.

*Examples 2–6*

A series of polymers were prepared employing the general procedure set forth above and subsequently hydrolyzed. These polymers were characterized by the pressence of hydroxyl to carboxyl groups within the ratio contemplated by this invention and substantially the same as the mole ratio of comonomer used in the preparation of polymer as indicated in the table below.

MOLE RATIO OF COMONOMERS CHARGED IN PREPARATION OF POLYMER AND MOLE RATIO OF COMONOMERS FOUND [1] IN POLYMER

| Example | Vinyl Acetate | | Ethyl Acrylate | |
|---|---|---|---|---|
| | Charged | Found | Charged | Found |
| 2 | 13 | 12 | 87 | 88 |
| 3 | 31 | 30 | 69 | 70 |
| 4 | 57 | 52 | 43 | 48 |
| 5 | 80 | 76 | 20 | 24 |
| 6 | 92 | 90 | 8 | 10 |

[1] By IR analysis.

The reflectance values achieved by the resulting polymers form the basis for the accompanying drawing, reference to which is made herein, which drawing is a graph demonstrating the surprising soil redeposition inhibiting property of the polymer composition contemplated by this invention as compared with homopolymers of vinyl alcohol and of sodium acrylate.

This graph, which relates reflectance to composition, illustrates the soil suspending performance of vinyl alcohol-sodium acrylate copolymers over a wide range of mole ratios. In this series of tests reported in the graph, carboxymethyl cellulose (CMC) high viscosity Type 70, a known soil redeposition inhibitor, gave a reflectance of 46.5%. All of the polymers of this invention made using from 35 to 98 mole percent of vinyl acetate were superior to CMC. The mole ratios of vinyl acetate to ethyl acrylate in the starting materials substantially correspond to the hydroxyl to carboxyl ratio in the finished product. This has been congrmed by infrared transmission measurements and by titration of the carboxylate groups.

Polymer viscosity will vary with composition. However, this variation does not correlate with soil redeposition inhibiting properties. Thus, good soil anti-redeposition properties were obtained with the highest and the lowest viscosity material. This is an advantage of the present invention since it gives the products great versatility. Thus, in liquid detergent formulations low viscosity is desirable. In other applications it may be good to have a high viscosity.

Holding copolymer composition constant, soil anti-redeposition effectiveness is found to be directly proportional to molecular weight as reported in terms of the specific viscosity ($N_{sp.}$) of the polymer. This will be illustrated by the following data. The hydrolyzed copolymers were prepared by the techniques reported in Example 1 except for the additional use of various amounts of n-butyl mercaptan as a modifier of polymer viscosity.

EFFECT OF MOLECULAR WEIGHT OF A 75/25 MOLE PERCENT VINYL ALCOHOL-SODIUM ACRYLATE COPOLYMER ON SOIL SUSPENDING PROPERTIES

|  | $N_{sp.}$ | Percent Reflectance |
|---|---|---|
| Polymer: |  |  |
| 1 | 1.60 | 63 |
| 2 | 0.93 | 52 |
| 3 | 0.55 | 35 |

Reflectance values are obtained by a modification of the method of Bayley and Weatherburn set forth in the Textile Research Journal, volume XX, No. 7, July 1950.

In this test, test fabric cut in 4 by 4 inch squares are wet out with water prior to entering them into the detergent solution.

The reflectance of the test cloth is measured on a Hunter reflectometer and four readings are taken on each sample and are averaged arithmetically. The tests are run in both distilled and hard water. The hard water is prepared by dissolving a mixture of 3 parts of calcium chloride and 2 parts of magnesium chloride in sufficient water to give 180 parts per million (p.p.m.) hardness calculated as the calcium carbonate.

The detergent employed is a commercially available alkyl aryl sulfonate (having no soil suspending agent present) and detergent solutions are prepared by dissolving one gram of the formulated mix in hard or soft water to give one liter of solution.

Twenty-two grams of carbon black are dispersed in 78 cc. of water by placing a bottle of the slurry on a shaker for 10 minutes. The resulting colloidal black has a particle size of 10 to 25 millimicrons.

The soil anti-redeposition agents are weighed out separately on an analytical balance and transferred directly to the Launder-ometer jar prior to pouring in the detergent solution. Quantities ranging from 0.5%, 1%, 2.5%, 5% and 10% on the weight of active detergent, i.e., alkyl aryl sulfonate, are used. For preliminary screening 1% on detergent is used, but for liquid detergents as much as 10% may be employed.

Ten ¼ inch stainless steel balls are then placed in each pint Launder-ometer jar. The soil anti-redeposition agent is weighed out and transferred to the jar and 200 ml. of detergent solution are added. The temperature is adjusted to 135° F. and 4 ml. of carbon black dispersion are added with stirring. After the carbon black is dispersed, two pieces of the prepared cut cloth previously wet with water are added to each jar. The jars are then sealed.

The so-called jars are placed in the Launder-ometer and rotated for 20 minutes at 135° F. The jars are removed and each set of cloth is placed in a separate 400 ml. marked beaker. The beaker and its contents are placed under running tap water at 100° F. to 120° F. for 30 seconds, excess water is squeezed from the cloth and the cloth dried by ironing between clean pieces of cloth until dry. The reflectances are measured as noted by a Hunter reflectometer.

*Examples 7–9*

Employing essentially the emulsion polymerization procedure as is identified above the following monomers were reacted with vinyl acetate in the following mole ratios and the hydrolyzed copolymers produced the following reflectance values:

TABLE I

| Ex. | Comonomer used with Vinyl Acetate | VA/Comonomer Molar Ratio | OH=COONa Ratio by IR | Reflect. percent |
|---|---|---|---|---|
| 7 | Methyl acrylate | 87–13 | 50/50 | 44 |
| 8 | Methyl methacrylate | 93–7 | 90/10 | 47 |
| 9 | Acrylonitrile | 85–15 | 85/15 | 59 |
|  | CMC [1] |  |  | 41.8 |

[1] Carboxymethyl cellulose.

Table I above demonstrates the superiority of polymers contemplated by this invention relative to carboxymethyl cellulose, a commercial standard.

In order to emphasize the improvement of the soil redeposition inhibitors of this invention over the commercially available standard carboxymethyl cellulose, a hydrolyzed copolymer having a hydroxyl to carboxyl molar ratio of 72:28, formed from 69 parts by weight of vinyl acetate and 31 parts by weight of ethyl acrylate, or a hydrolyzed copolymer having a hydroxyl to carboxyl molar ratio of 75:25, formed from 72 parts by weight of vinyl acetate and 28 parts by weight of ethyl acrylate, is compared with carboxymethyl cellulose. The wash tests were run at 90° and 135° F. in a Launder-ometer using 0.1% of a commercially available anionic detergent which is an alkyl aryl sulfonate. In addition to the detergent various concentrations of the soil anti-redeposition agents as indicated in Table II hereinbelow were added to the solution. Tests containing various types of carboxymethyl cellulose were included for comparison purposes as control. The alkyl aryl sulfonate detergent, without soil anti-redeposition agent, was also added for control purposes.

Results of this comparison appear in Table II hereinbelow.

TABLE II.—PERFORMANCE OF SOIL ANTI-REDEPOSITION AGENTS AS DETERMINED IN LAUNDER-OMETER

[Soil Anti-redeposition Expressed as Reflectance of Fabric Washed]

| Soil Anti-redeposition Agent [1] | | Water Type and Temperature | | | |
|---|---|---|---|---|---|
| Type | Visc. | Tap Water | | Hard Water (300 p.p.m. CaCO$_3$) | |
|  |  | 90° F. | 135° F. | 90° F. | 135° F. |
| 1 (98%) |  | 69.3 | 62.3 | 58.0 | 55.3 |
| 1 (50%) |  | 70.2 | 65.3 | 58.1 | 56.1 |
| 2 (98%) |  | 73.1 | 67.5 | 58.3 | 55.2 |
| 3 CMC | High | 55.3 | 47.6 | 33.4 | 34.0 |
| 3 CMC | Medium |  | 38.4 | 35.2 | 30.9 |
| 3 CMC | Low |  | 38.9 | 38.0 | 30.5 |
| Detergent only |  | 29.5 | 20.1 | 27.5 | 20.1 |

[1] Concentration of agent used was 1% on detergent or 10 p.p.m. in 0.1% detergent—carbon black wash solution. pH about 9.2.
  1. Polymer 69 parts vinyl acetate, 31 parts ethyl acrylate—hydrolyzed.
  2. Polymer 72 parts vinyl acetate, 28 parts ethyl acrylate—hydrolyzed.
  3. Carboxymethyl cellulose.

Table II above demonstrates the superiority of the soil anti-redeposition agents of this invention when compared with the standard carboxymethyl cellulose on a weight basis in both hard and soft water.

I claim:

1. A detergent composition capable of preventing the redeposition of soil comprising a detergent and as a soil redeposition inhibitor an organic linear hydrocarbon chain polymer containing relative molar ratios of hydroxyl to carboxylic acid group of from about 30 to 99 to 1 to about 70, respectively, said polymer being present in effective soil redeposition inhibiting amounts.

2. A detergent composition capable of preventing the redeposition of soil in the cleaning of fabric comprising an organic detergent, and in effective soil redeposition inhibiting amounts, a substantially linear hydrocarbon chain polymer, containing hydroxyl and carboxylic acid groups, the relative molar ratios between said hydroxyl and carboxylic acid groups being from about 60 to 90 to 40 to about 10, respectively, said polymer being the product of the hydrolysis of a copolymer of vinyl acetate and a carboxylic acid selected from the group consisting of acrylic acid, methacrylic acid, acrylonitrile, acrylamide, lower alkyl acrylates and lower alkyl methacrylates.

3. A detergent composition capable of preventing the redeposition of soil in the cleaning of fabric comprising an organic detergent, and in effective soil redeposition inhibiting amounts, an alkaline hydrolyzed polymer formed by polymerizing a lower alkyl acrylate and vinyl acetate in relative ratios of from about 60 to 90 mols of acetate to 40 to about 10 mols of acrylate.

4. A detergent composition capable of preventing the redeposition of soil in the cleaning of fabric comprising an organic detergent, and in effective soil redeposition inhibiting amounts, a hydrocarbon chain polymer, said polymer being an alkaline hydrolyzed polymer formed by polymerizing ethyl acrylate and vinyl acetate in relative ratios of from about 60 to about 90 mols of acetate to about 40 to 10 mols of acrylate.

5. A detergent composition capable of preventing the redeposition of soil in the cleaning of fabric comprising from about 5 to about 95 parts by weight of a water-soluble organic detergent and as a soil redeposition inhibitor, from about 0.1 to about 20 parts by weight of a hydrocarbon chain polymer, said polymer containing hydroxyl and carboxylic acid groups, the relative mol ratio between said hydroxyl and carboxylic acid group being from about 60 to 90 to 40 to about 10, respectively, said polymer being the product of hydrolysis of a copolymer of vinyl acetate and a carboxylic acid selected from the group consisting of acrylic acid, methacrylic acid, acrylonitrile, acrylamide, lower alkyl acrylates and lower alkyl methacrylates.

6. A detergent composition capable of preventing the redeposition of soil in the cleaning of fabric comprising from about 5 to about 95 parts by weight of a water-soluble anionic organic detergent and as a soil redeposition inhibitor from about 0.1 to about 20 parts by weight of a hydrocarbon chain polymer, said polymer containing hydroxyl and carboxylic acid groups, the relative mol ratio between said hydroxyl and carboxylic acid group being from about 60 to 90 to 40 to about 10, respectively, said polymer being the product of hydrolysis of a copolymer of vinyl acetate and a carboxylic acid selected from the group consisting of acrylic acid, methacrylic acid, acrylonitrile, acrylamide, lower alkyl acrylates and lower alkyl methacrylates.

References Cited by the Examiner

UNITED STATES PATENTS

| | | | |
|---|---|---|---|
| 2,327,302 | 8/1943 | Dittmar | 252—132 |
| 2,727,835 | 12/1955 | Barrett | 260—86.1 XR |
| 3,061,551 | 10/1962 | Rutenberg et al. | 252—161 |
| 3,083,172 | 3/1963 | Scott et al. | 260—86.1 XR |
| 3,144,412 | 8/1964 | Inamorato | 252—161 XR |

FOREIGN PATENTS 225,786  8/1958  Australia.

LEON D. ROSDOL, *Primary Examiner.*

JULIUS GREENWALD, *Examiner.*

W. SCHULZ, *Assistant Examiner.*

UNITED STATES PATENT OFFICE
CERTIFICATE OF CORRECTION

Patent No. 3,284,364                                    November 8, 1966

Frederick H. Siegele

It is hereby certified that error appears in the above numbered patent requiring correction and that the said Letters Patent should read as corrected below.

Column 2, line 17, for "purposes" read -- purpose --; line 19, for "its" read -- it --; column 7, line 16, strike out "substantially linear".

Signed and sealed this 5th day of September 1967.

(SEAL)
Attest:

ERNEST W. SWIDER                                    EDWARD J. BRENNER
Attesting Officer                                       Commissioner of Patents